United States Patent [19]

Check et al.

[11] 4,044,216

[45] Aug. 23, 1977

[54] MULTIPLE ELECTRODE ELECTRICAL DISCHARGE MACHINING

[75] Inventors: John M. Check, Chelsea; Gary F. Rupert, Ann Arbor, both of Mich.

[73] Assignee: Raycon Corporation, Ann Arbor, Mich.

[21] Appl. No.: 662,025

[22] Filed: Feb. 27, 1976

[51] Int. Cl.² .............................................. B23P 1/08
[52] U.S. Cl. ................................................ 219/69 E
[58] Field of Search .............. 219/69 E, 69 G, 131 F, 219/136, 139; 204/222, 225; 226/162–166; 13/14–17

[56] References Cited

U.S. PATENT DOCUMENTS

| | | | |
|---|---|---|---|
| 3,517,153 | 6/1970 | Check | 219/69 E |
| 3,601,572 | 8/1971 | Check et al. | 219/69 E |
| 3,694,620 | 9/1972 | Gleason | 219/136 |
| 3,822,374 | 7/1974 | Ullmann et al. | 219/69 W |
| 3,855,442 | 12/1974 | Check et al. | 219/69 E |

Primary Examiner—Bruce A. Reynolds
Attorney, Agent, or Firm—Olsen and Stephenson

[57] ABSTRACT

Electrical discharge machining apparatus in which a plurality of generally parallel electrodes are moved during machining and during refeed in generally parallel paths. A drive roller assembly is provided for refeeding the electrodes after each machining cycle to compensate for erosion of the electrodes that occurred during the preceding machining cycle. The drive roller assembly consists of a plurality of rollers arranged on opposite sides of the electrodes so that the electrodes are drivingly engaged between the rollers. In one embodiment of the invention, the rollers slip on the electrodes after the electrodes have been moved to positions engaging the work until all of the electrodes have been moved into engagement with the work. In another embodiment of the invention, each electrode is independently driven and engagement of each electrode with the work is electrically sensed and in response to such sensing, the drive for that electrode is discontinued. In all cases, the drive roller assembly for refeeding the electrodes is deactivated during machining and the electrodes are firmly clamped against the carriage on which the drive roller assembly is supported.

11 Claims, 10 Drawing Figures

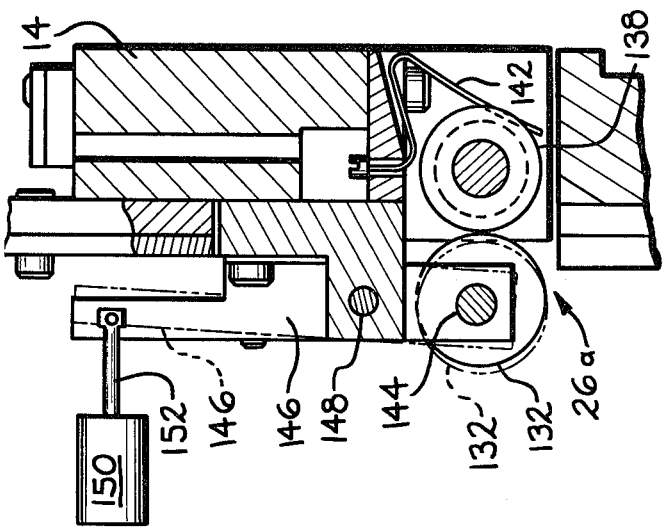
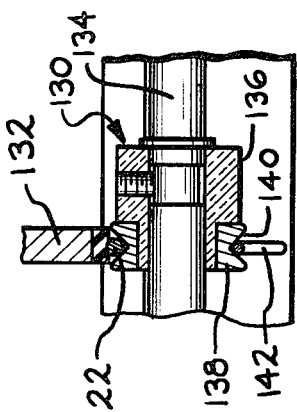
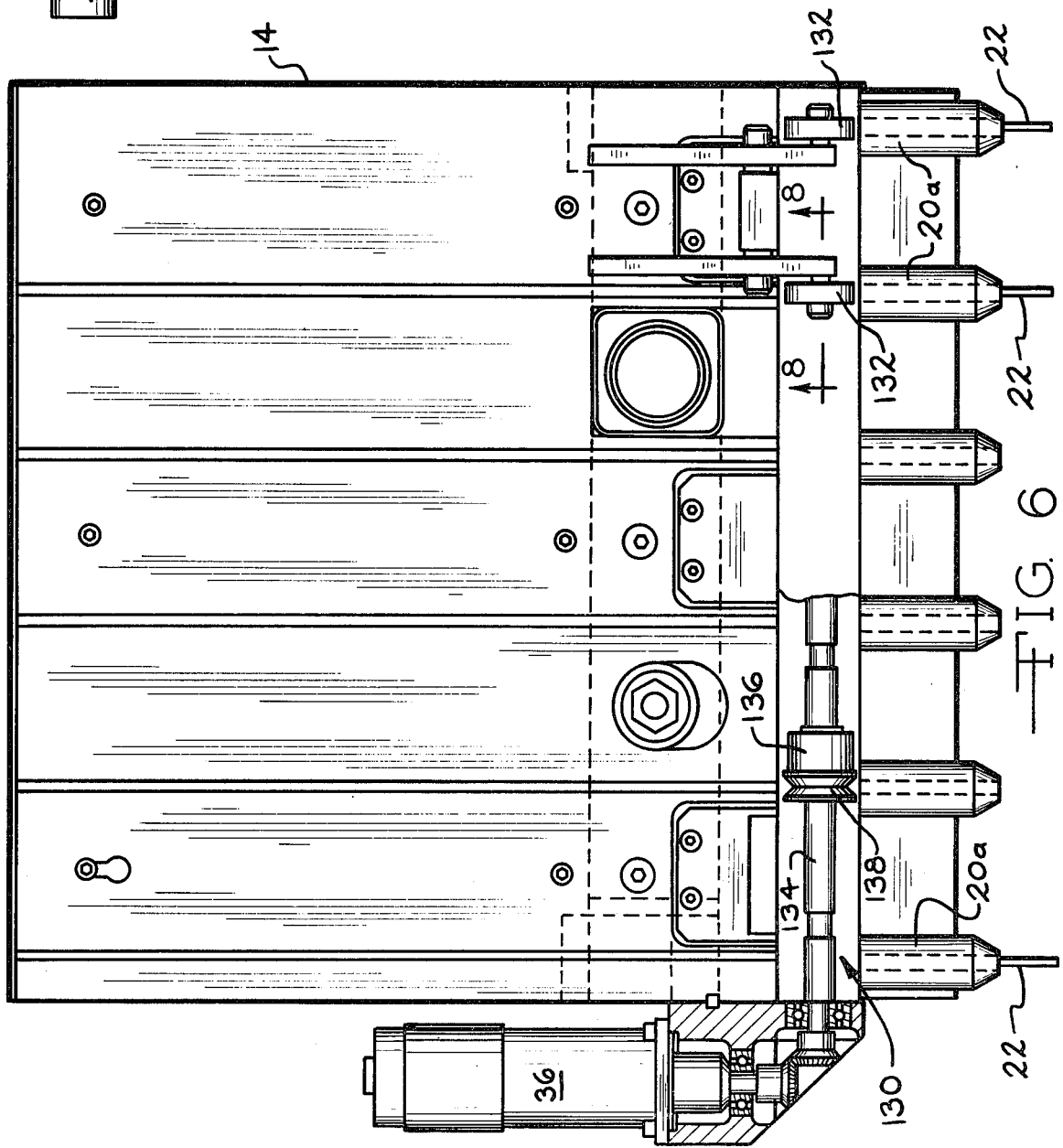

MULTIPLE ELECTRODE ELECTRICAL DISCHARGE MACHINING

BACKGROUND OF THE INVENTION

U.S. Pat. No. 3,729,609, assigned to the assignee of this application, discloses electrical discharge machining apparatus in which a plurality of substantially parallel wire electrodes are used to concurrently machine a plurality of small holes in a workpiece. The patent discloses apparatus in which the electrodes are manually refed following each machining cycle to compensate for electrode erosion that took place during the preceding cycle. It is an object of the present invention to provide improved electrical discharge machining apparatus of multiple electrode type in which the electrodes are automatically mechanically refed following each machining cycle to compensate for erosion.

SUMMARY OF THE INVENTION

The electrical discharge machining apparatus of this invention consists of a main frame or platen on which a carriage or slide is mounted for movement back and forth toward and away from the work to be machined. A plurality of generally parallel electrodes are mounted on the carriage for movement therewith to machine holes in the work. An electrode guide member is mounted in a fixed position on the frame adjacent the work for guiding the electrodes into engagement with the work. A drive roller assembly mounted on the carriage is operable to drive the electrodes into engagement with the work following each machining cycle to compensate for electrode erosion which occurred during the preceding cycle. A clamp mechanism is mounted on the carriage between the refeed rollers and the electrode guide member for clamping the electrodes in fixed positions on the carriage during the machining cycle so as to preclude any undesirable movement between the electrodes and the carriage during the machining cycle.

In one embodiment of the invention, the drive roller assembly is adjusted so that it will slip on an electrode which has been moved into engagement with the work during electrode refeed following a machining cycle. Since electrode erosion is not uniform, refeed of one electrode more than another is required following each cycle. Slipping of the drive rollers on the electrodes enables all of the electrodes to be driven into engagement with the work prior to termination of refeed. When it is sensed that all electrodes are engaged with the work, refeed is automatically terminated. In another embodiment of the invention, each electrode is independently driven and the drive for that electrode is terminated as soon as the electrode engages the work. This prevents bending or breaking of the electrode during refeed and is particularly useful with electrodes of very small diameter.

In all forms of the invention, the electrodes are firmly clamped against the carriage following the completion of the refeed, for subsequent movement with the carriage during the machining cycle. The clamping units employed in this invention provide for the independent clamping of each electrode and insure fixed positions of the electrodes on the carriage during the machining cycle.

The electrical discharge machining apparatus of this invention is thus capable of repeatedly and rapidly forming large numbers of small holes in workpieces.

Further objects, features and advantages of this invention will become apparent from a consideration of the following description, the appended claims, and the accompanying drawing in which:

FIG. 6 is a top view of a portion of another embodiment of the apparatus of this invention, with some parts removed for the purpose of clarity;

FIG. 7 is a fragmentary side view of a portion of the apparatus shown in FIG. 6;

FIG. 8 is a fragmentary sectional view of a portion of the apparatus shown in FIG. 6 as seen from substantially the line 8—8 in FIG. 6.

Figure 1:
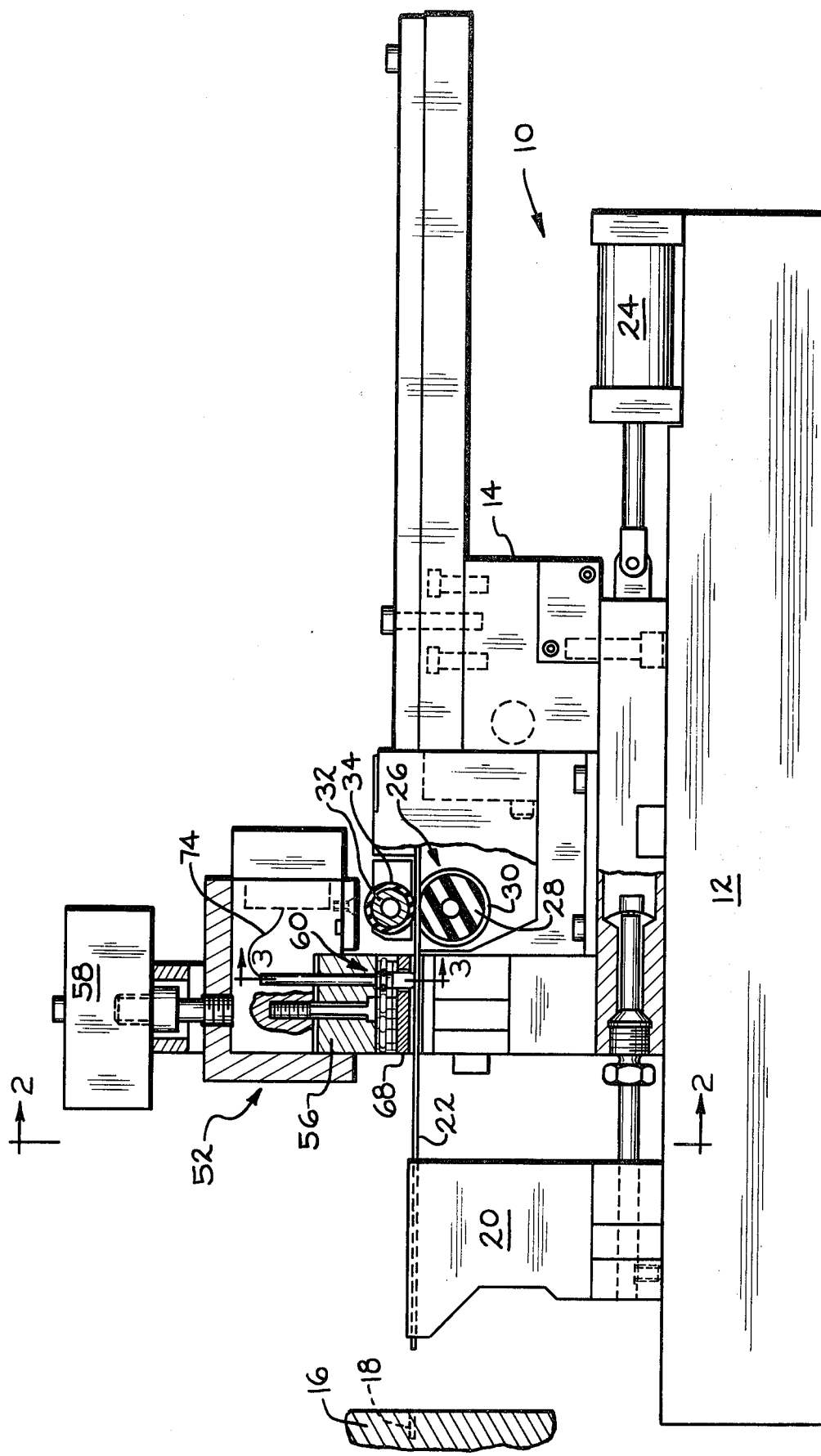
FIG. 1 is a side elevational view of the apparatus of this invention, with some parts broken away and other parts shown in section for the purpose of clarity.

With reference to the drawing, the electrical discharge machining apparatus of this invention, indicated generally at 10, is shown in FIG. 1 as including a main frame or platen 12 on which a carriage or slide 14 is slidably mounted for movement toward and away from a workpiece 16 for the purpose of forming a plurality of openings 18 therein by the EDM process. An electrode guide member 20 is mounted in a fixed position on the frame 12 for guiding a plurality of substantially parallel horizontally spaced electrodes 22 into engagement with the work 16 so as to form the holes 18 therein. As used herein, the term "substantially parallel electrodes" is inclusive of electrodes that are generally parallel over a portion of their lengths only, it being understood that is is sometimes desirable to form the holes 18 so that they are not parallel with respect to each other, and it is sometimes desirable for mechanical reasons to fan out the electrodes 22.

A motor assembly 24 on the frame 12 is connected to the carriage 14 for moving the carriage 14 toward the electrode guide member 20, and thus the work 16, during a hole forming machining cycle and for retracting the carriage 14 relative to the work 16 following each cycle.

The apparatus 10 of this invention is particularly useful in forming small holes 18 with wire electrodes 22. One of the known phenomenon that takes place during electrical discharge machining with wire electrodes 22, is the erosion of the electrodes during the machining cycle. The erosion is not uniform and must be compensated for prior to the next machining cycle. The step of replenishing the eroded portions of the electrodes 22 is referred to herein as "refeed".

Figure 4:
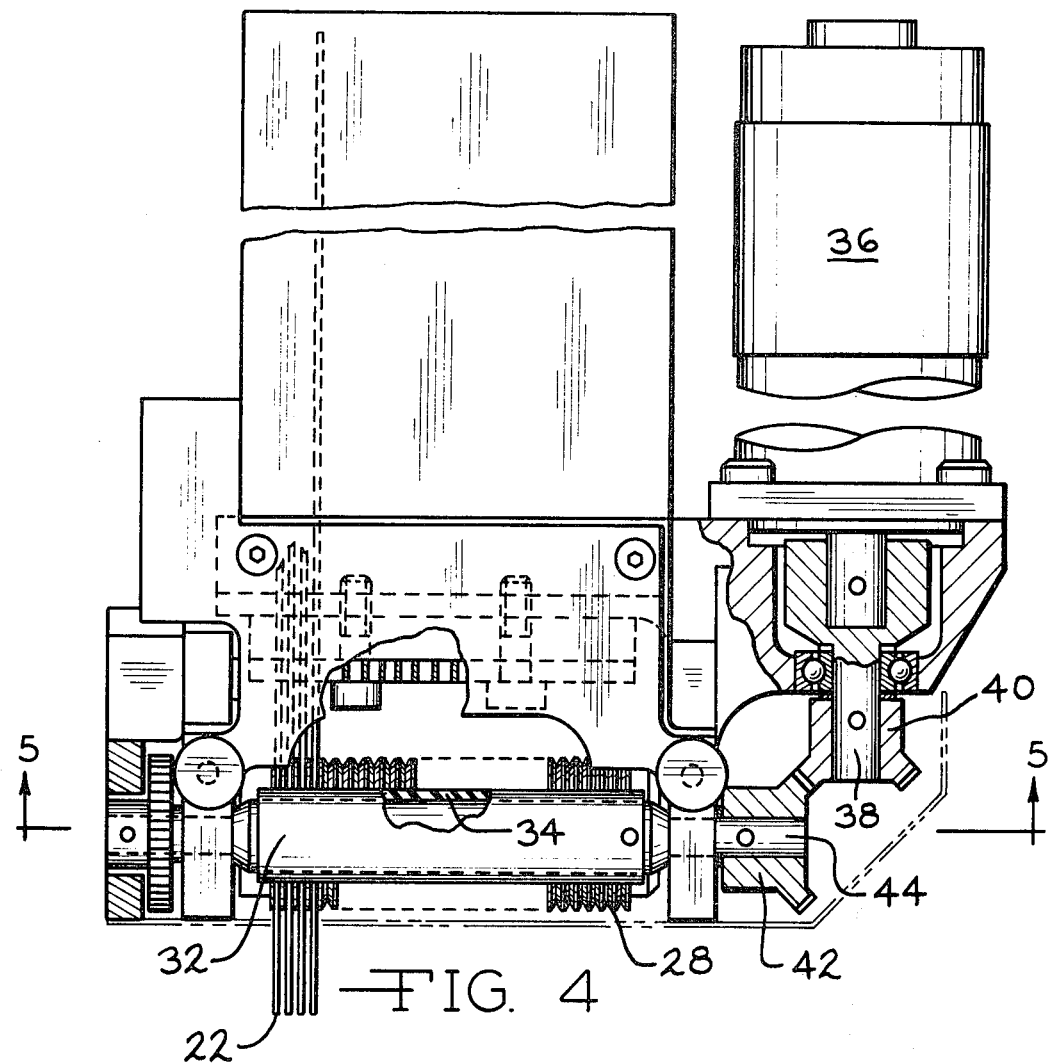
FIG. 4 is a top view of the drive roller assembly in the apparatus of this invention with some parts broken away and other parts shown in section for the purpose of clarity.
Figure 5:
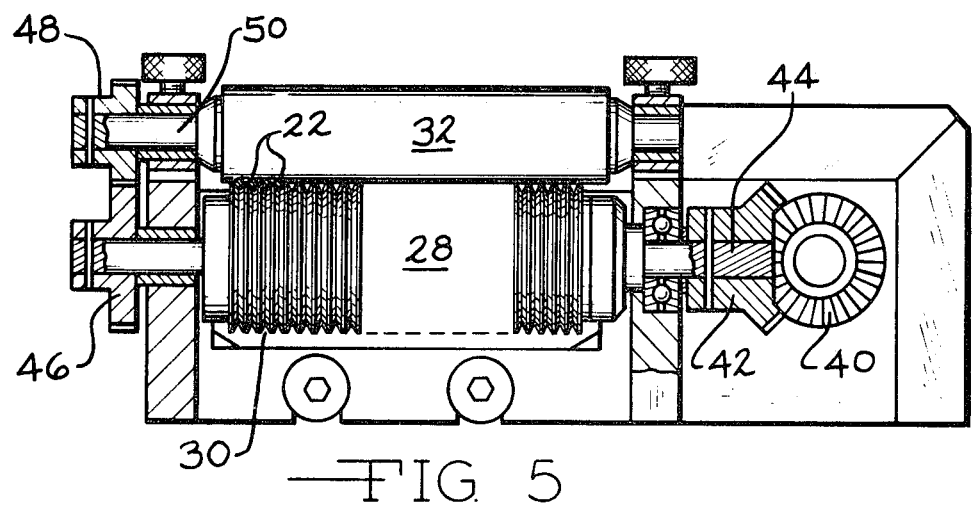
FIG. 5 is a transverse sectional view of the drive roller assembly in the apparatus of this invention, as seen from substantially the line 5—5 in FIG. 4.

In the apparatus 10, an electrode drive roller assembly 26 is provided for driving the electrodes 22 into engagement with the work 16 following each machining cycle. This refeed of the electrodes 22 places the electrodes in positions in which they can be located to commence the next machining cycle, namely, in spark producing positions spaced slightly rearwardly from the work 16. As shown in FIGS. 1, 4 and 5, the drive roller assembly 26 consists of a lower roller 28 provided with a plurality of parallel circumferential grooves 30 and an upper roller 32 provided with a surface layer 34 of yieldable material having a high coefficient of friction, such as rubber. The layer 34 is electrically non-conductive and the material from which the roller 28 is made is likewise of a non-conductive material.

As shown in FIG. 4, a carriage mounted drive motor 36 has an output shaft 38 on which a gear 40 is mounted and positioned in meshing engagement with a second gear 42 secured to the drive shaft 44 for the roller 28. The drive shaft 44 carries a second gear 46 which meshes with a gear 48 on the shaft 50 for the upper roller 32. Thus, in response to operation of the motor 36, the rollers 28 and 32 are rotated in directions to move the electrodes 22 toward the work 16. More particularly, the roller 28 rotates in a counterclockwise direction as viewed in FIG. 1 and the roller 32 rotates in a clockwise direction. Each groove 30 is of a depth less than the diameters of the electrodes 22 so that the electrodes are firmly gripped between the rollers 28 and 32 as shown in FIG. 5. The yieldable outer layer 34 on the roller 32 facilitates the application of frictional driving forces to the electrodes 22.

An electrode clamping assembly 52 is mounted on the main frame 12 at a position between the drive roller assembly 26 and the wire guide member 20. The purpose of the electrode clamping assembly 52 is to enable clamping of the electrodes 22 onto the carriage 14 following refeed of the electrodes 22 to preclude any slipping of the electrodes relative to the carriage during the machining cycle.

Figure 2:
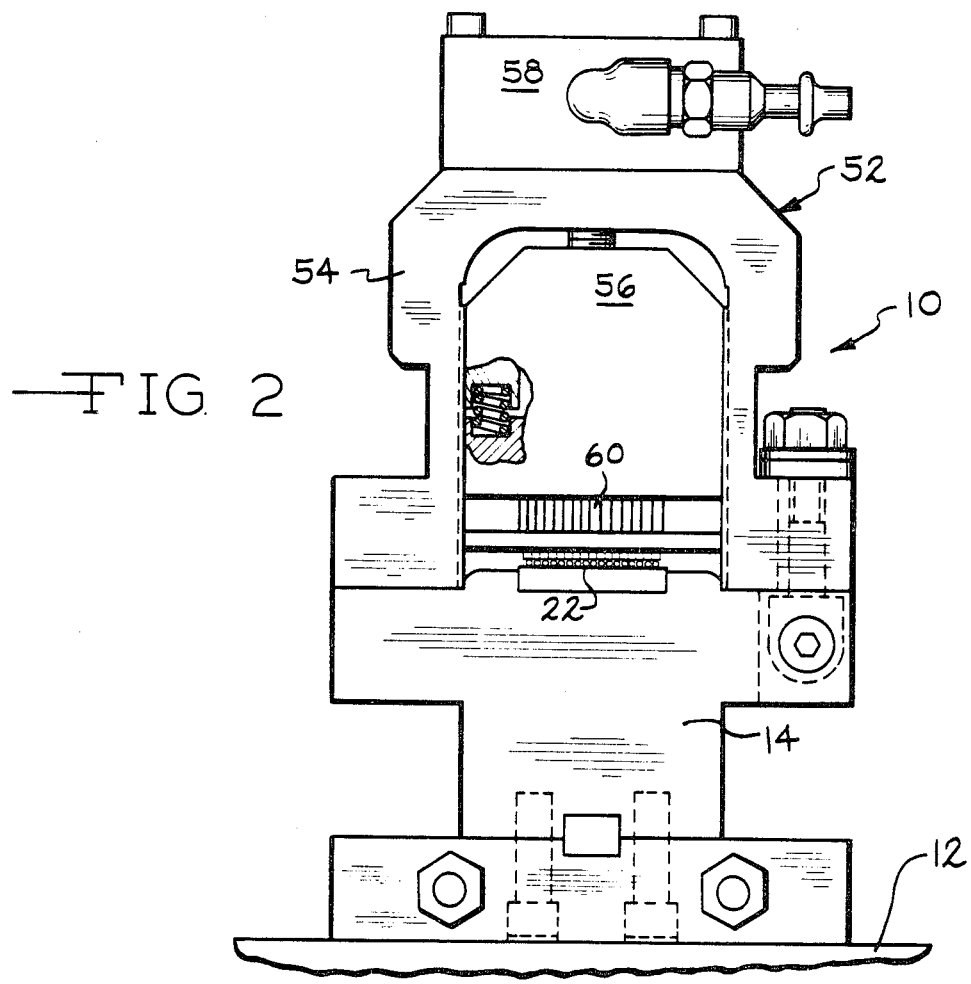
FIG. 2 is a transverse sectional view of the apparatus of this invention as seen substantially from the line 2—2 in FIG. 1, with some parts broken away and other parts shown in section for the purpose of clarity.
Figure 3:
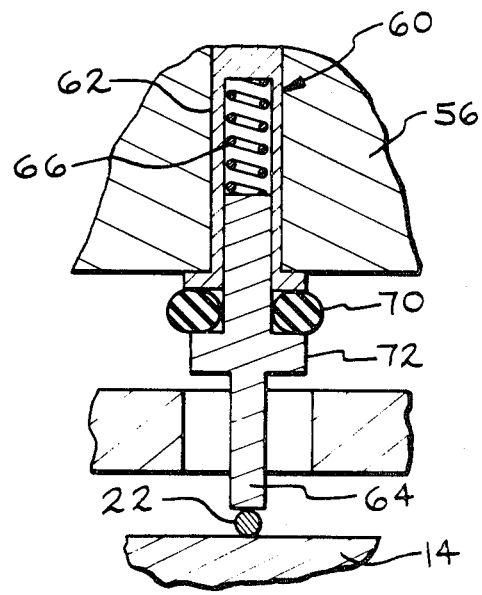
FIGS. 3 and 3A illustrate the electrode clamping unit in the apparatus of this invention, showing the unit in two relatively moved positions.

As shown in FIG. 2, the clamping assembly 52 comprises an inverted U-shape guide structure 54 mounted on and extended upwardly from the carriage 14. A head member 56 is guidably supported on the guide structure 54 and is connected to a motor assembly 58 on the guide structure 54 capable of moving the head member 56 up and down relative to the carriage 14. A plurality of electrode clamping units 60, only one of which is shown in FIG. 1, are mounted in the head member 56 and correspond in number to the number of electrodes 22. Each clamping unit 60 (FIGS. 3 and 3A) has a tubular part 62 mounted in the head member 56 so that it has a lower open end. A plunger part 64 is telescoped into the tubular part 62 into engagement with a compression spring 66 confined therein. The spring 66 urges the part 64 toward the electrode 22 which is supported on the top side of the carriage 14 in vertical alignment with the part 64. As shown in FIGS. 1 and 2, the tubular part 64 in each unit 60 is guidably supported in a guide plate 68 disposed below the head member 56 and fixed on the structure 54.

Figure 3A:
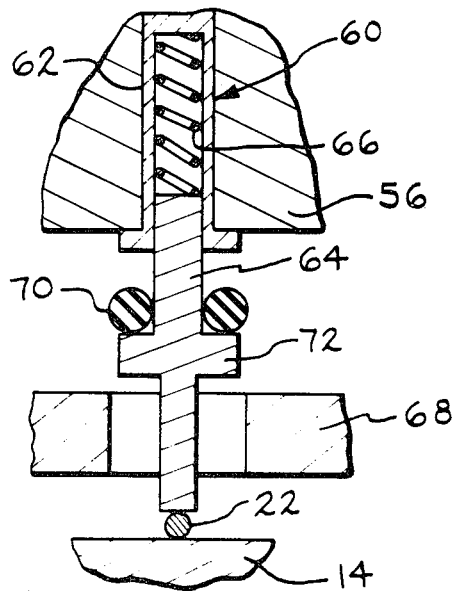

The springs 66 are of a strength to maintain the plunger parts 64 in engagement with the electrodes 22 as shown in FIG. 3A and to hold the electrodes 22 against the carriage 14. However, the force of each part 64 on its electrode is light enough to allow the electrode 22 to slide horizontally toward the work 16. The head 56 is in the FIG. 3A position during refeed. However, following completion of refeed, the head member 56 is moved downwardly by the motor 58 from the position shown in FIG. 3A to the position shown in FIG. 3 in which the head member 56 overrides the springs 66 and acts directly on the plunger parts 64. Compressible O-rings 70 on the parts 64 transmit force from the head member 56 to flanges 72 on the parts 64. The O-rings 70 tend to equalize the clamping forces applied to the electrodes by the plunger units 60 and to limit the total force applied to an electrode to that necessary to clamp the electrode against the carriage.

In the operation of the apparatus 10, assume that the components of the apparatus are in the positions illustrated in FIG. 1, that a machining cycle has just been completed, and that the next step is to refeed the electrodes 22 into engagement with the work 16. The drive motor 36 for the electrode drive roller assembly 26 is actuated so that the drive rollers 28 and 32 are rotated to move the electrodes 22 toward the work 16. During such operation of the drive motor 36, the head 56 is in the position shown in FIG. 3A so that the clamping units 60 are exerting light clamping pressure on the electrodes 22 so as not to interfere with horizontal sliding movement of the electrodes 22 on the carriage 14.

Figure 9:
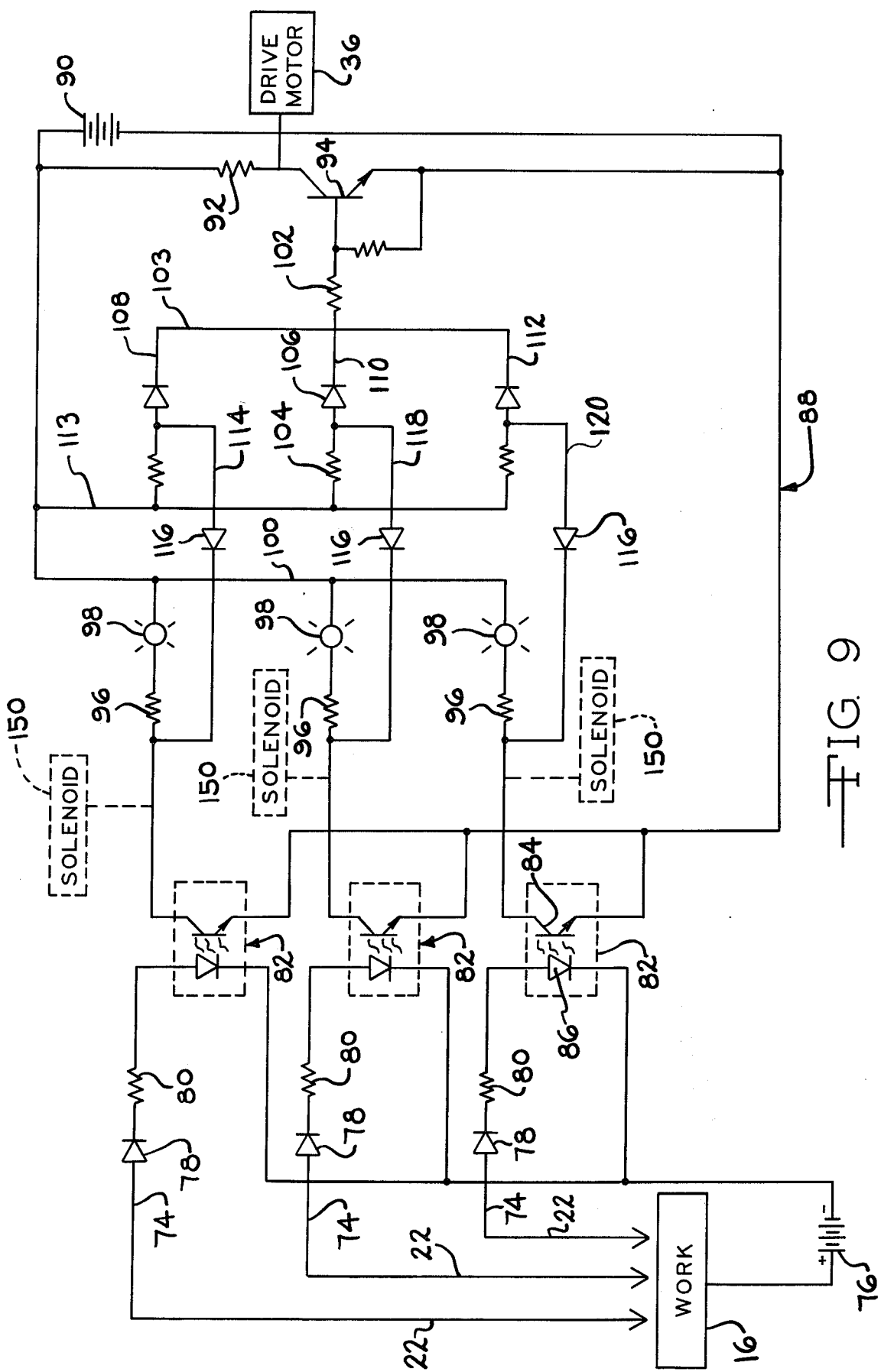
FIG. 9 is a circuit diagram showing a portion of the electrical circuitry in the apparatus of this invention for sensing electrode position, showing only three electrodes for purposes of simplicity.

Electrical leads 74, only one of which is shown in FIG. 1, connect the clamping units 60 to a power source 76 (FIG. 9) so that current is supplied to the electrodes 22 during refeed. As shown in FIG. 9, in which only three electrodes are shown for purposes of clarity, since it would only be repetitious to illustrate more, each electrode 22 is connected through a diode 78 and a resistor 80 to a light actuated relay 82 which includes a switching transistor 84 and a light emitting diode 86. The switching transistors 84 are connected in a sensing circuit 88 which includes a power supply 90 connected to the drive motor 36, a resistor 92 and a switching transistor 94 which, as will more clearly appear hereinafter, performs an AND function in the circuit 88. Each of the switching transistors 84 is connected through a resistor 96, an indicator light 98, and a lead 100 to the power source 90. The base of the transistor 94 is connected to the power supply 90 through a resistor 102 and a sub-circuit 103. The circuit 103 includes three parallel connected leads 108, 110, and 112, each of which is connected to a resistor 104 and a diode 106. A lead 113 connects the circuit 103 to the power source 90. The leads 108, 110 and 112 are each connected to one of the relays 82 by lines 114, 118 and 120 respectively so that each of the leads 108, 110 and 112 has a corresponding relay. Each of the lines 114, 118 and 120 includes a diode 116 which limits current flow to the direction indicated.

When the relays 82 are open, current is supplied to the base of the transistor 94 through all of the lines 108, 110 and 112 and this current keeps the transistor 94 on so as to keep the drive motor 36 on. However, in the event the relay 82 corresponding to the line 108 is closed, the current is diverted from the line 108 through the bypass line 114 and through the relay 82 so that current flow bypasses transistor 94. Similarly, bypass lines 118 and 120 are provided for diverting current from the lines 110 and 112 when the other two relays 82 are closed. Thus, when all of the relays 82 are closed, all of the current from source 90 is diverted away from transistor 94 thereby causing transistor 94 to turn off.

As a result, during refeed of the electrodes 22, when an electrode has been moved into engagement with the work 16, a circuit is completed through the light emitting diode 86 corresponding to the electrode 22, the diode turns on the transistor 94 and the relay 82 is closed. This condition is indicated by the corresponding light 98. The drive wheels 28 and 32 continue to rotate, since the drive motor 36 remains on until all electrodes 22 have engaged the work 16. Consequently, the rollers 28 and 32 simply slip on the electrodes 22 that have engaged the work 16 and are thus prevented from further movement. As each successive electrode 22 engages the work 16, the light 98 corresponding to the electrode will indicate the engagement condition and the switching transistor 94 will be closer to being turned off. However, the transistor 94 stays on until all of the electrodes 22 have engaged the work so that all of the current from source 90 is diverted from transistor 94, at which time the transistor 94 turns off, operation of the drive motor 36 is discontinued, and the rollers 28 and 32 stop rotating. While three electrodes are shown in the circuit 88, it is to be understood that any number can be used and that the transistor 94 will not turn off until all electrodes have engaged the work.

At this time, all of the electrodes 22 are in physical engagement with the work 16. The head 56 is then moved downwardly to the position shown in FIG. 3 so as to clamp the electrodes 22 with increased force against the carriage 14 so as to preclude movement of the electrodes 22 relative to the carriage 14 during machining. The motor 24 is operated to retract the carriage 14 so as to move the electrodes 22 away from the work 16 a distance known at the "anti-short distance". In the anti-short position of the electrodes 22, they are in positions such that when supplied with a machining current, a machining spark will be created between each electrode and the work which forms the holes 18 in the work as the carriage 14 is moved toward the work 16 so as to maintain an anti-short distance between the electrode and the work.

When the holes 18 have been formed, the motor 24 is operated to retract the carriage to the position shown in FIG. 1, so as to withdraw the electrodes 22 from the holes 18 in the work. The head 56 is moved to its position shown in FIG. 3A so as to relieve the pressure on the electrodes 22 and the drive motor 36 is started to commence another refeed of the electrode 22.

In the above described embodiment of the apparatus 10, the electrodes 22 are forced against the work 16 by the roller assembly 26 and are maintained in positions against the work by the moving force of the roller assembly 26 until all of the electrodes 22 have been engaged with the work 16. In some situations, the electrodes 22 cannot tolerate this continued application of force during refeed. An example of such a situation is a case in which the electrodes 22 are formed of such small diameter wire that they would be bent if they were repeatedly forced against the work 16.

In such cases, the apparatus 10 is modified to the extent illustrated in FIGS. 6 to 8. As shown in FIG. 8, the electrodes 22 are individually supported on wire guides 20a and are driven by a drive roller assembly 26a which is driven in the manner heretofore described by a drive motor 36. The drive roller assembly 26a consists of a lower roller unit 130 and a plurality of upper roller members 132 corresponding in number to the number of electrodes 22 so that each roller 132 is associated with a single electrode 22.

The roller unit 130 consists of a drive shaft 134, preferably formed of metal, and a plurality of blocks 136 of electrically insulating material. The blocks 136 are spaced apart lengthwise of the shaft 134 and correspond in number to the number of rollers 132. A roller 138, of electrically conducting material such as metal, is fixedly mounted on each of the blocks 136 in alignment with one of the rollers 132. As shown in FIG. 8, each roller 138 has a peripheral groove 140 of a depth less than the diameter of an electrode 22 so that the electrode 22 projects slightly radially outwardly of the groove 140. The corresponding roller 132, which is constructed like the roller 32 previously described, with a resilient outer surface, frictionally clamps the electrode 22 between the rollers 132 and 138.

Since the rollers 138 are electrically insulated from each other by the blocks 136, current can be conveniently supplied to the electrodes 22 by leads 142 which frictionally engage the rollers 138 on the undersides thereof as shown in FIG. 7. Each of the rollers 132 is rotatably mounted on a shaft 144 carried on one end of an arm 146 which is pivotally supported intermediate its ends on a pin 148 mounted on the carriage 14. A solenoid 150 is connected by a rod 152 to the opposite end of the arm 146 and is operable when energized to move the arm 146 downwardly to the broken line position shown in FIG. 7. Movement of the arm 146 to this position lifts the roller 132 out of engagement with the electrode 22 and discontinues the drive to that electrode 22. Thus, by virtue of the independent mounting of each of the rollers 132, the drive for each electrode 22 can be independently terminated.

In the operation of the apparatus 10 with the modifications illustrated in FIG. 6, when each electrode 22 engages the work, its corresponding solenoid 150, which is shown in broken lines in FIG. 9, is energized to discontinue the drive for that electrode because the drive roller 132 for that electrode is disengaged from the rotating roller unit 130. When all of the electrodes have been moved into engagement with the work, the switching transistor 94 is turned off and operation of the drive motor 36 is discontinued so that rotation of the roller unit 130 is terminated.

From the above description, it is seen that this invention provides improved electrical discharge machining apparatus in which a plurality of electrodes 22 are concurrently operable to perform hole forming machining operations on a workpiece 16. Following each hole forming machining cycle, the electrodes are quickly and automatically brought into machining position with respect to the next workpiece 16 to thereby enable the achievement of a high rate of production.

It is claimed:

1. In electrical discharge machining apparatus for machining a workpiece wherein a plurality of generally parallel electrodes are moved during machining and during refeed in generally parallel paths, means for refeeding said electrodes to compensate for erosion thereof during maching comprising a drive roller assembly, said assembly consisting of a plurality of rollers arranged on opposite sides of said electrodes and having said electrodes drivingly engaged therebetween, means for rotating the rollers in said roller assembly so as to refeed said electrodes toward engagement with said workpiece, said rollers being operable to slip on any of said electrodes that are engaged with said workpiece during refeeding of other of said electrodes toward engagement with said workpiece, and means providing for termination of said roller rotation only in response to engagement of all of said electrodes with said workpiece.

2. Apparatus according to claim 1 further including means for sensing engagement of said electrodes with work to be machined, said means providing for termination of said roller rotation being responsive to said sensing means to terminate roller rotation only when all of said electrodes have engaged the work.

3. Apparatus according to claim 1 wherein said roller assembly comprises at least one pair of rollers, one of said rollers being provided with at least one surface groove and having one of said electrodes disposed therein, said grooved roller and said electrode being relatively dimensionally proportioned so that said electrode projects outwardly of said groove, the other one of said rollers in said pair having a resilient yieldable surface having a high coefficient of friction, and being engaged with said electrode so as to frictionally clamp said electrode between said pair of rollers.

4. Apparatus according to claim 1 further including a main frame, an electrode guide member mounted in a fixed position on said frame and guidingly engaged with said electrodes, a carriage movably mounted on the frame for movement toward and away from said electrode guide member, said carriage having said drive roller assembly and said electrodes mounted thereon and being capable of moving said electrodes toward said electrode guide member during machining.

5. Apparatus according to claim 4 further including means on said carriage disposed between said roller assembly and said electrode guide member for clamping said electrodes onto said carriage.

6. Apparatus according to claim 5 wherein said means for clamping said electrodes onto said carriage comprises a plurality of clamp units corresponding in number to said electrodes and movable independently of each other into engagement with said electrodes, each of said clamp units being connected to an electrical lead capable of supplying machining current to said electrode.

7. Apparatus according to claim 6 further including a head member supporting said clamp units, each of said clamp units including a tubular part connected to said electrical lead and a plunger part telescoped within said tubular part, spring means in said tubular part engaged with said plunger part and operable to move said plunger part into engagement with one of said electrodes, and means for moving said head member toward said electrodes to compress said spring members and increase the clamping force exerted on said electrodes by said clamping units.

8. Apparatus according to claim 7 further including resilient compressible members disposed between said clamp unit plunger parts and said head member in positions to transmit forces directly from said head member to said plunger parts for clamping said electrodes against said carriage.

9. In electrical discharge machining apparatus for machining a workpiece wherein a plurality of generally parallel electrodes are moved dring machining and during refeed in generally parallel paths, means for refeeding said electrodes to compensate for erosion thereof during machining comprising a drive roller assembly, said assembly consisting of a plurality of rollers arranged on opposite sides of said electrodes and having said electrodes drivingly engaged therebetween for movement into engagement with the workpiece during refeed, and said assembly including clamping rollers corresponding in number to the number of said electrodes, means movably supporting each of said clamping rollers on said carriage and means operatively associated with each of said supporting means capable of selectively moving said clamping rollers out of driving engagement with the corresponding electrodes when said corresponding electrodes engage the workpiece to thereby enable refeeding of each of said electrodes to be selectively terminated independently of the refeeding of the remaining electrodes.

10. Apparatus according to claim 9 wherein said movable supporting means for said clamping rollers comprises a plurality of support members corresponding in number to said clamping rollers, means pivotally supporting each of said support members on said carriage and motor means connected to each of said support members and operable to pivot the support members in directions to move said clamping rollers out of driving engagement with said electrodes.

11. Apparatus according to claim 10 further including means operable to sense engagement of each of said electrodes with the work, and means responsive to sensing of the engagement of an electrode with the work to actuate said motor means for the clamping roller driving said electrode so as to move said roller out of driving engagement with said electrode.

* * * * *